(12) United States Patent
Santillan Galvan

(10) Patent No.: US 10,087,570 B2
(45) Date of Patent: Oct. 2, 2018

(54) INTELLIGENT ELECTRONIC SYSTEM FOR PREVIOUSLY SENSING THE DRYNESS CONDITION OF A TEXTILE CLOTHES LOAD IN AN AUTOMATIC ELECTRONIC CLOTHES DRYER MACHINE

(71) Applicant: MABE, S.A. DE C.V., Santiago de Queretaro, Queretaro (MX)

(72) Inventor: Raul Santillan Galvan, Queretaro (MX)

(73) Assignee: MABE, S.A. DE C.V., Queretaro (MX)

( * ) Notice: Subject to any disclaimer, the term of this patent is extended or adjusted under 35 U.S.C. 154(b) by 303 days.

(21) Appl. No.: 14/688,203

(22) Filed: Apr. 16, 2015

(65) Prior Publication Data

US 2016/0076193 A1    Mar. 17, 2016

(30) Foreign Application Priority Data

Apr. 16, 2014 (MX) .................... MX/a/2014/004659

(51) Int. Cl.
| | |
|---|---|
| *G01M 1/38* | (2006.01) |
| *D06F 58/28* | (2006.01) |
| *G05B 15/02* | (2006.01) |

(52) U.S. Cl.
CPC ............. *D06F 58/28* (2013.01); *G05B 15/02* (2013.01); *D06F 2058/2816* (2013.01); (Continued)

(58) Field of Classification Search
CPC .. D06F 58/28; D06F 2058/2816; G05B 15/02 (Continued)

(56) References Cited

U.S. PATENT DOCUMENTS

| | | | |
|---|---|---|---|
| 7,942,937 B2 | 5/2011 | Brun | |
| 9,382,654 B2 * | 7/2016 | Leitert | ................. D06F 39/003 |

(Continued)

FOREIGN PATENT DOCUMENTS

| | | |
|---|---|---|
| CN | 2479049 | 2/2002 |
| CN | 2005116061 | 5/2007 |

(Continued)

*Primary Examiner* — Robert Cassity
(74) *Attorney, Agent, or Firm* — Terry M. Sanks, Esq.; Beusse Wolter Sanks & Maire, PLLC

(57) ABSTRACT

An intelligent electronic system for previously sensing the dryness condition of a textile clothes load applicable to an automatic electronic clothes dryer machine is disclosed, which comprises: an electronic integrated circuit of the microcontroller type located in a dryer machine, wherein said microcontroller receives and processes signals coming from a plurality of temperature sensing means and from humidity sensing means in order to make decisions and to inform the dryer machine what action it must execute; as well as a method for previously sensing the dryness condition of a textile clothes load applicable to any automatic electronic clothes dryer machine for home use, wherein said method comprises the steps of: (a) collecting information about air temperature at the drum's outlet and inlet, as well as information on the humidity conditions of the textile clothes load; (b) with the information collected in step a) above determining whether the dryer machine is cold or warm; (c) letting a first period of time to elapse during which measuring of air temperature conditions of the drum's outlet and inlet as well as humidity conditions of said textile clothes load continues; (d) checking whether or not said conduit is obstructed; (e) letting a second period of time to elapse during which measuring of air temperature conditions of the drum's outlet and inlet as well as humidity conditions of said textile clothes load continues; (f) determining whether the textile clothes load is small or large; (g) determining whether the textile clothes load is small or large; and, (h) checking whether or not the large or small textile clothes load is dry, by comparing the humidity conditions of said small or large load against a preset parameter.

8 Claims, 3 Drawing Sheets

(52) U.S. Cl.
CPC .............. *D06F 2058/2829* (2013.01); *D06F 2058/2858* (2013.01); *D06F 2058/2861* (2013.01)

(58) Field of Classification Search
USPC ........................................................ 700/275
See application file for complete search history.

(56) References Cited

U.S. PATENT DOCUMENTS

| | | | | |
|---|---|---|---|---|
| 2007/0068036 | A1* | 3/2007 | Choi ...................... | D06F 58/28 34/528 |
| 2007/0251118 | A1* | 11/2007 | Doh ....................... | D06F 58/28 34/528 |
| 2009/0272004 | A1* | 11/2009 | Chernetski ............. | D06F 58/10 34/389 |
| 2011/0162228 | A1* | 7/2011 | Park ....................... | D06F 58/20 34/427 |
| 2015/0059200 | A1* | 3/2015 | Prajescu ................. | D06F 58/28 34/282 |

FOREIGN PATENT DOCUMENTS

| | | |
|---|---|---|
| CN | 102140756 | 8/2011 |
| EP | 2584086 | 4/2013 |
| EP | 2607546 | 6/2013 |
| EP | 2610388 | 7/2013 |
| EP | 2610401 | 7/2013 |

\* cited by examiner

INTELLIGENT ELECTRONIC SYSTEM FOR PREVIOUSLY SENSING THE DRYNESS CONDITION OF A TEXTILE CLOTHES LOAD IN AN AUTOMATIC ELECTRONIC CLOTHES DRYER MACHINE

CROSS-REFERENCE TO RELATED APPLICATIONS

This application claims priority to Mexican Patent Application No. MX/a/2014/004659 filed. Apr. 16, 2014, and incorporated herein by reference in its entirety.

FIELD OF THE INVENTION

The present invention relates to the principles and techniques used in the Home Appliances Industry, as well as in the Control Engineering Industry, for the development of new systems and processes allowing to perform some of the routine home duties more easily, and in a safety and reliable manner, also allowing to save time and power consumption, and more particularly, it relates to an intelligent electronic system to previously sense the dryness condition of a textile garments load in an automatic electronic clothes dryer machine, as well as a method for carrying out said dryness sensing.

BACKGROUND OF THE INVENTION

The drying of garments, bed clothing and linen in general after being washed is a task that can be problematic, mainly in rainy regions or in homes without drying areas.

In view of the above, home dryer machines are additional accessories to washing machines that assist in the duties of cleaning garments.

Generally and basically, the operation of a dryer machine consists in allowing forced hot air to enter into a rotatory drum, inside which wet clothes rotate.

Two main drying systems exist, namely:

Drying by evacuation, wherein wet air is ejected out via a tube, where the tube length should be so that it avoids condensation of water steam before exiting to the outside, Drying by condensation, wherein wet air is directed to a condenser where it is converted into water and subsequently recollected.

There is a third drying system known as drying by centrifugation, wherein garments are loaded in cylindrical perforated drum, which rotates at high revolutions, thus removing water from said garments.

In the state of the art there are several dryer machines that use different drying methods for drying garments, such as the U.S. Pat. No. 7,942,937 which refers to a control method of a dryer machine that reads a temperature variation per time unit allowing drying according to the quantity and type of objects to be dried. The method comprising the steps of starting a drying procedure; measuring a temperature variation per time unit during the drying procedure; calculating a total drying time based on the temperature variation measured per time unit; and performing the drying procedure for the calculated total drying time. The drying time determines which step is to be repeated if a substantial increment in the temperature variation is sensed.

The U.S. patent application Ser. No. 11/509,798 (Publication No. US 2007/0068036 A1) relates to a laundry cleaning appliance including a drum, a heater, a blower, a dryness sensor and a controller. The drum accommodates garments. The heater and the blower supply hot air to the drum. The dryness sensor senses the dryness of garments. The controller controls the temperature of the heater depending on changes in the dryness of fabric garments sensed by the dryness sensor. The temperature of hot air is controlled so as to be high when the dryness of garments is low, so that there are advantages in that the performance of drying garments is improved, and the drying time of fabrics is shorten. The temperature of hot air is controlled so as to be low when the dryness of garments is high, so that there are advantages in that the over-dry of fabrics is prevented, and therefore damages to garments due to said predetermined parameter is prevented.

European Patent Application No. 20110195787 (Publication No. EP2610388 A1) relates to a Laundry drying machine comprising a rotatory laundry drum; an electric motor for rotating said rotatory laundry drum about its axis of rotation; hot air generator means configured to supply a drying airflow to the drum during a drying cycle; an electronic control system configured to: provide a signal indicative of the torque that said electric motor provides to the rotatory laundry drum, sense the inside-temperature of the drying airflow inside the drum, sense the output temperature of the airflow which flows out from the rotatory drum, determine a comparison threshold based on the sensed signal, determine a temperature difference between the sensed output temperature and the sensed inside temperature, compare the determined temperature difference with the determined comparison threshold and stop the drying cycle according to the comparison result.

European Patent Application No, 20110195942 (Publication No. 2610401 A1) comprises a rotatory laundry drum designed to rotate about an axis of rotation; an electric motor which is mechanically connected with the rotatory washing drum for rotating said rotatory washing drum about its axis of rotation; hot-air generator means configured to supply a heated airflow to the drum during a drying cycle; and, an electronic control system configured to: provide a sensed signal which is indicative of a torque that said electric motor provides to the rotatory washing drum; determine the value of a parameter that is indicative of the variation of the sensed signal in time, and estimate the laundry load contained within said chamber based on said determined value of said parameter.

European Patent Application No. 20110818424 (Publication No. EP2607546) describes a laundry machine having a drying function and comprises: a rotatory installed drum, a heater that generates hot air, a fan, a filter that filters the hot air, a sensor that senses a hot airflow resistance generated by a flow channel through which the hot air flows, and a controller which determines whether or not the filter is obstructed on the basis of the hot-airflow resistance sensed by the sensor.

European Patent Application No. 20110186051 (Publication No. EP2584086) relates to a clothes drying machine, or to combined clothes washing and drying machine, comprising a drum suitable to receive the clothes to be dried; an air circulating system adapted to circulate a flow of drying air into the drum; an outlet circuit located on the lower portion of the drum, for the exhaust air exiting the drum, a lint filter device arranged in the outlet circuit; a control device for controlling said clothes drying machine during a drying cycle; and, a moisture sensor connected to the control device for measuring the moisture level of the clothes during the drying cycle. The moisture sensor comprises at least two electrical contacts associated to the lint filter device and connected to the control device. The control device is configured for calculating a control parameter indicative of the impedance between the electrical contacts and for controlling the drying cycle according to the value of the control parameter.

Chinese Patent No. CN20020227 (Publication No. CN2479049) describes an automatic device for detecting the drying of clothes of clothes driers, comprising power circuits which provide the current working voltage of the following circuits. The utility model of the automatic device for detecting the drying of clothes is characterized in that the utility model further comprises a temperature and humidity sensing circuit, comprising a driving circuit which receives and amplifies the signals from push buttons and a display circuit, a control circuit of a micro-gyroscope which respectively receives and process the signals from the temperature and humidity sensing circuit and of the driving circuit, a transducer circuit which receives the signals from a control circuit of microcontroller and which generates sounds, and an executing circuit which receives the signals from signals of a control circuit of a microcontroller and which drives high voltage pulses of ignition and from the motor rotation. The utility model reduces the usage cost, is capable of automatically adjust the amount of the heat supply, shortens the clothes drying time, and is capable of automatically discriminate whether or not the clothes are already dry, thereby automatically controlling the clothes drying process.

Chinese Patent No. CN20101104998 (Publication No. CN102140756 A) refers to a method for automatically drying clothes by using a clothes dryer. The method comprises the following steps: sorting a load; heating and drying the load; determining the drying level of the load by combining a system with the temperature and humidity characteristics of the load, and controlling the heating and drying process of the load; and cooling the load. Through this method, the disadvantages of specific procedures in the prior art for drying specific clothes can be overcome, the problem that heavy clothes, such as a bedspread, and the like, cannot be dried automatically are solved, and the function of accurately drying various common clothes by using a common procedure is realized. In addition, the method can realize accurate automatic drying of heavy clothes, such as a towel, a bedspread, and the like.

Chinese Patent No. CN2005116061 (Publication No. CN1966841 A) relates to an automatic drying control method, comprising a humidity sensor output value to check the output value variance and determine the minimum output voltage. Broaden the output value and the minimum output voltage, set different dryness degrees as references based on judgment. Compare the voltage value to change Delta V of the current output value with the minimum output voltage with the dryness reference point so as to decide the drying end point. With the output value change as a reference to decide the dryness degree, the convenience of application can be improved. If the voltage change value of the humidity sensor is kept above certain value for a period of time, an over-drying or incomplete drying at the end of the drying process can be prevented. Besides, the inaccurate judgment for the drying end point can be prevented.

According to the above, it can be seen from the state of the art documents that there is a great variety in machines and methods for drying textile clothes, which comprise sensors for sensing the dryness or humidity level of clothes, but this is realized during or at the end of the drying cycle, and it may take a long period of time to sense said condition, which, in some instances, is up to about 20 minutes.

But, what happens when the clothes load already dry before the automatic dryer machine starts the drying cycle? This condition can occur, because housewives or housekeepers in charge of cleaning the garments or linen in general often perform others duties at the same time and forget whether or not they already turned on the drying machine for drying said garments, thus wasting time and power by turning on the machine again, and also overheating the clothes and thereby resulting in an premature deterioration of the clothes.

Consequently, there is a great waste of power that can be prevented if prior to starting the dryer machine the condition of the textile clothes load, whether dry or wet, is sensed.

OBJECT OF THE INVENTION

Considering the prior art drawbacks, it is an object of the present invention to provide an intelligent electronic system allowing for previously sensing a dryness condition of a textile clothes load, which is technically very simple but highly efficient in sensing whether said clothes load is already dry, and to prevent overheating thereof, and, accordingly, early deterioration of said clothes.

Another object of the present invention is to provide an intelligent electronic system for previously sensing the dryness condition of a clothes load allowing accomplishing the same in the lowest time possible and preventing unnecessary power consumption, since the clothes are dry, there is no need to dry what is already dry.

An additional object of the present invention is to provide an intelligent electronic system for previously sensing the dryness condition of a clothes load allowing the user to save time in duties such as cleaning of garments, bed clothing and linen in general.

Another object of the present invention is to provide an intelligent electronic system for previously sensing the dryness condition of a clothes load having a very low initial humidity percentage.

A further object of the present invention is to provide a method for carrying out previous sensing of the dryness condition of a textile clothes load which operates efficiently for a wide range of textile clothes, and further sensing whether said load is large or small, as well as several temperature and humidity conditions inside the dryer machine.

Still another object of the present invention is to provide an intelligent electronic system for previously sensing the dryness condition of a clothes load, as well as a method for carrying out said sensing, wherein said system and method can be applied in any automatic electronic clothes dryer machine.

BRIEF DESCRIPTION OF THE INVENTION

Before turning on an automatic clothes dryer machine to start a normal drying cycle it is important to check if the textile clothes load is dry or still wet, since there might be the case where said load is already dry and an unnecessary dry cycle is started, thus consuming power to dry what is already dry.

Accordingly, a new intelligent electronic system was developed to previously sense the dryness condition of a textiles clothes load in any automatic electronic clothes dryer machine, as well as a method for carrying out said sensing. Said intelligent electronic system comprises: an electronic integrated circuit of the microcontroller type located in a dryer machine, wherein said microcontroller receives and processes signals coming from a plurality of temperature sensing means and from humidity sensing means in order to make decisions and to inform the dryer machine what action it must execute.

The microcontroller integrally comprises a memory for programming and storing conditions and parameters previously established and against which the signals received from the plurality of temperature sensing means and humidity sensing means are to be compared with, since said microcontroller is programmable in an assembly language within a programming environment; additionally, said microcontroller has a specific programming frequency and an instruction cycle time.

The plurality of temperature sensing means are located at the drum's air outlet and inlet and is comprised by at least to sensors that operates to detect or sense the air temperature at the drum's outlet and inlet.

The humidity sensing means are located at the drum's air outlet and comprise a rod sensor for sensing the humidity of said textile clothes load.

The method for previously sensing the dryness condition of a textile clothes load by means of the intelligent electronic system conceived to previously sense the dryness condition as claimed in the relevant claims, is characterized in that it comprises the steps of:

(a) Collecting information about the air temperature of the drum's outlet and inlet by using temperature sensing means, which send pulses or signals to the microcontroller, similarly pulses or signals of the humidity condition of the textiles clothes load are sent to the microcontroller by using humidity sensing means; the microcontroller with said signals or pulses received determines the initial conditions of the dryer machine prior to starting up the motor of said dryer machine;

(b) Determining, with the information obtained in the above step a), whether the dryer machine is cold or warm and comparing said information with previously programmed parameters;

(c) Letting a first period of time to elapse during which pulses or signals of air temperature conditions at the drum's outlet and inlet will continue being received via the temperature sensing means, as well as the humidity conditions via the humidity sensing means of said textile clothes load;

(d) Verifying whether or not the outlet conduit is obstructed, since said conduit may be blocked by any foreign object:

(e) Letting a second period of time to elapse during which measuring of air temperature conditions of the drum's outlet and inlet, as well as humidity conditions of said textile clothes load continues;

(f) Determining whether the textile clothes load small or large by calculating a second heating slope as well as a third heating slope by using incoming data from the outlet and inlet temperature sensors; wherein the absolute value of the arithmetic difference of both slopes are compared with a preset parameter; if said difference between slopes is lower than the preset value, then the load is considered to be small; otherwise the load is considered to be large.

(g) Determining humidity conditions of the textile clothes load; if the load is small the load is checked for humidity or dryness, this is done via the rod sensors by comparison of the actual value versus a reference preset value; if the load is dry, then the microcontroller instructs to stop the drying cycle, otherwise it instructs to continue with the normal drying cycle.

(h) Letting a third period of time to elapse during which the microcontroller continues to read and store data from both the outlet and inlet temperature sensors, as well as to get readings from the rod sensors.

(i) Determining humidity conditions of the textile clothes load if the load is large, this is done by means of the drum's outlet temperature sensors, which values are compared with a reference preset value; if the load is dry, then the microcontroller instructs to stop the drying cycle, otherwise it instructs to continue with the normal drying cycle.

(j) Reviewing humidity by zones, this is performed by means of the rod sensors, in order to calculate a humidity condition, when the microcontroller has calculated said data, it compares it with a humidity preset parameter for large loads; if the microcontroller determines the absence of humidity zones, then it instructs to stop the drying cycle, otherwise it instructs to continue with the normal drying cycle.

BRIEF DESCRIPTION OF THE FIGURES

The novel aspects that are considered characteristic of the present invention are particularly set forth in the appended claims. The invention itself, however, both as to its construction and its method of operation, together with additional objects and advantages thereof, will be best understood from the following detailed description of a particularly preferred embodiment when read and understood in connection with the accompanying drawing, wherein:

DETAILED DESCRIPTION OF THE EMBODIMENT OF THE INVENTION

Before turning on an automatic clothes dryer machine to initiate a normal drying cycle it is important to check if the textile clothes load is dry or still wet, since there might be the case where said load is already dry and an unnecessary dry cycle is started, thus consuming power to dry what is already dry.

Accordingly, a new intelligent electronic system was developed to previously sense the dryness condition of a textile clothes load, as well as a method for carrying out said sensing.

Figure 1:
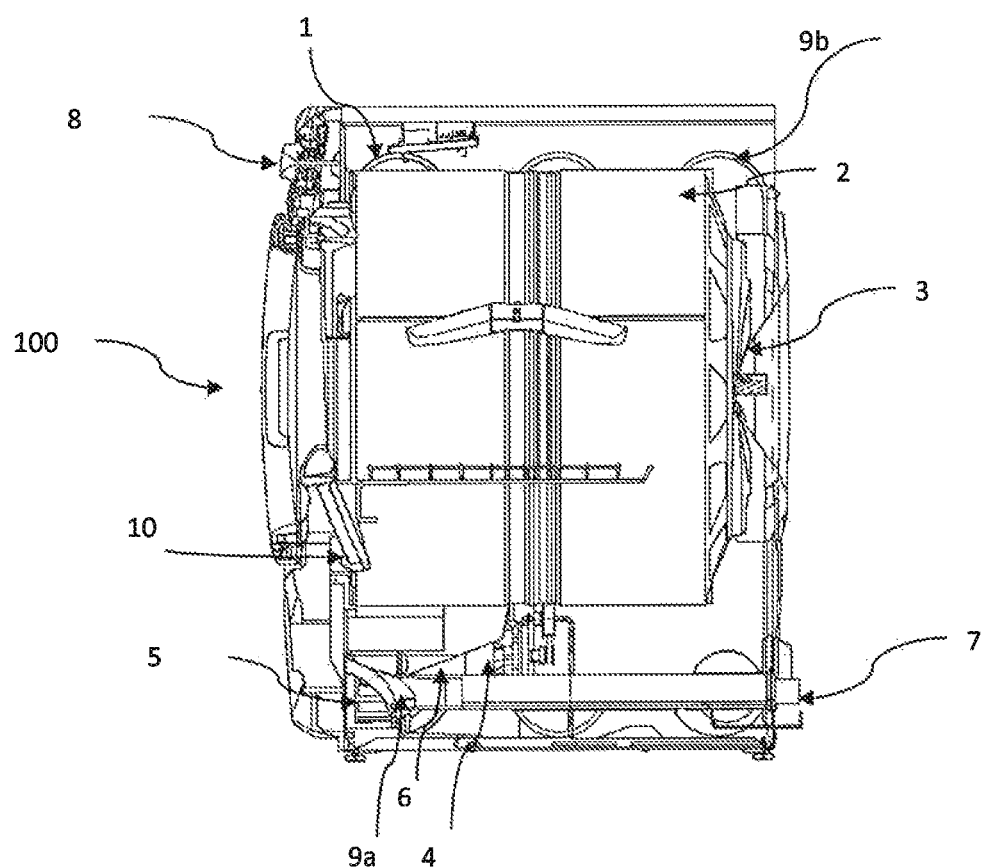
FIG. 1 is a schematic view showing the internal structure of an automatic dryer machine for home use including an intelligent electronic system for previously sensing the dryness condition of a textile clothes load.
Figure 2:
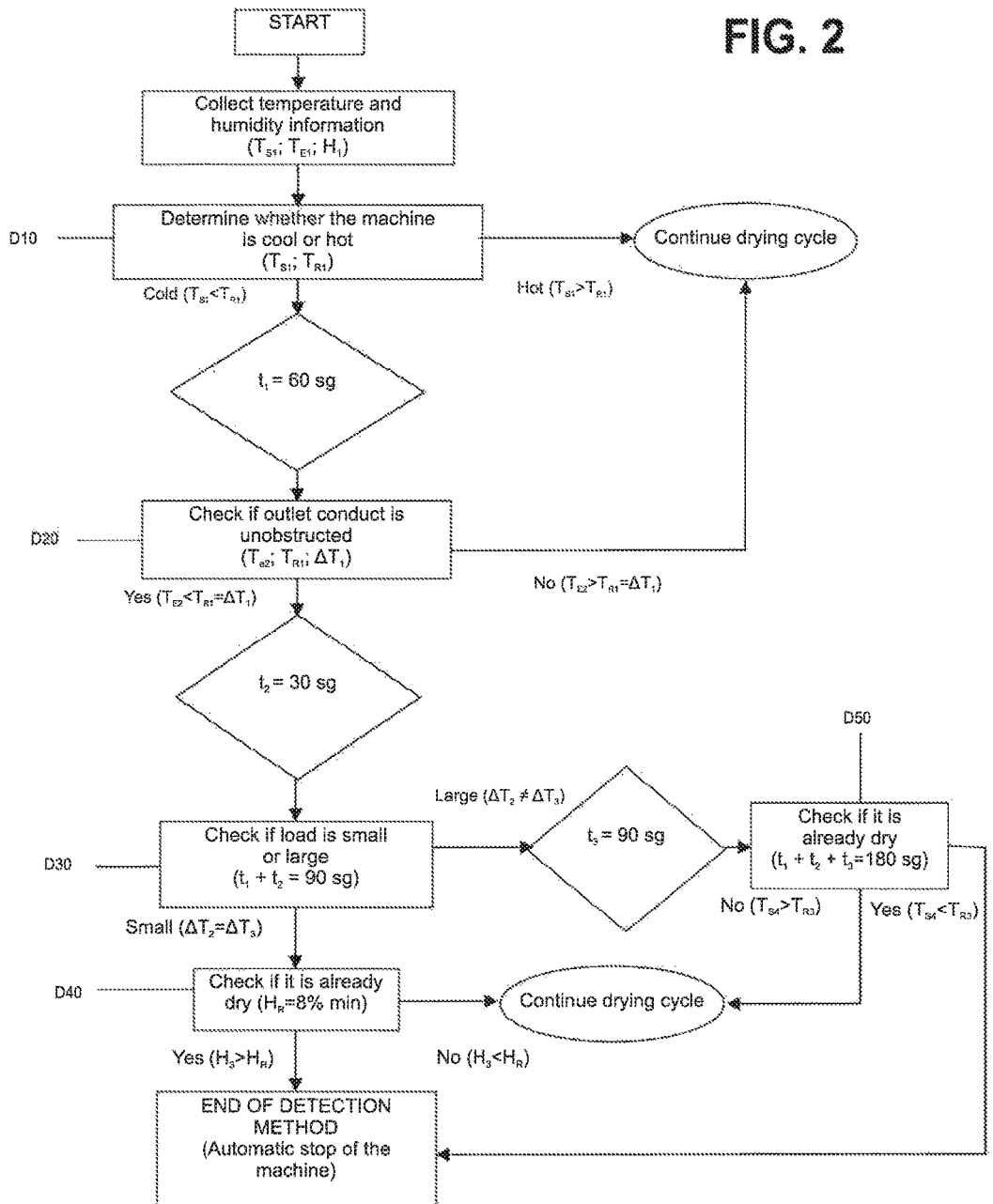
FIG. 2 is a block diagram illustrating several steps of a method for previously sensing the dryness condition of a textile clothes load, carried out by the intelligent electronic system which was developed by using the principles of a particularly preferred embodiment of the present invention.
Figure 3:
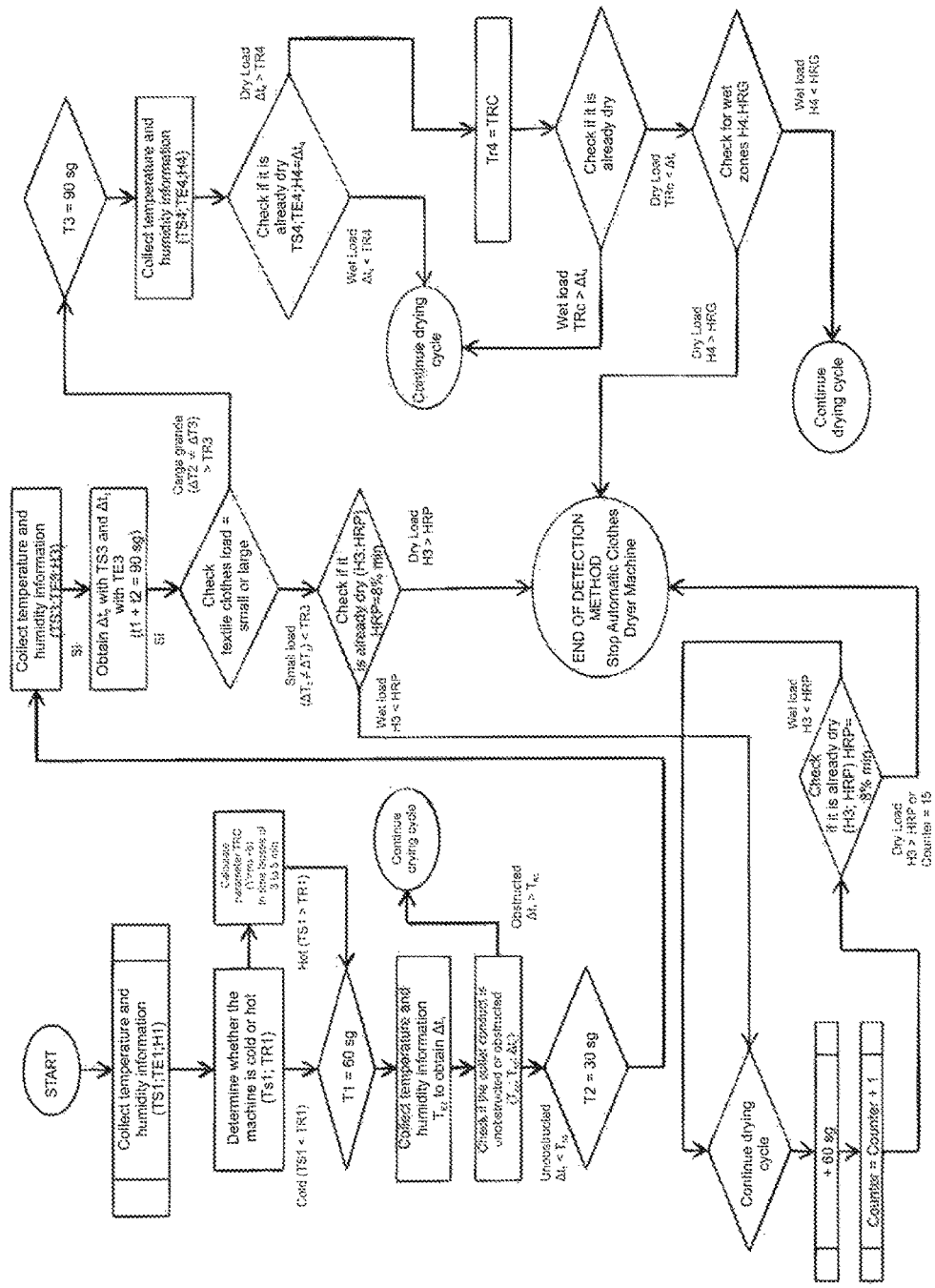
FIG. 3 is a block diagram illustrating several steps of a method for previously sensing the dryness condition of a textile clothes load, showing alternative embodiments that can be realized by the intelligent electronic system, which was developed by using the principles of a particularly preferred embodiment of the present invention.

Referring to the accompanying FIGS. 1, 2, 3, and more specifically to FIG. 1, the internal structure of an automatic electronic clothes dryer machine (100) for home use is shown therein, whose main function is to dry clothes. However, thanks to its technical and structural features, said dryer machine (100) can be used to detect the dryness of clothes before the drying cycle starts and prevent power consumption in drying a clothes load already dried, this is accomplished by including in said dryer machine (100) an ($H_{RP}$) intelligent electronic system, which carries out the sensing of the dryness condition of the textile clothes load, wherein said system will allow the dryer machine (100) to make decisions according to preset conditions and parameters. In other words, the intelligent electronic system will allow the dryer machine (100) to automatically stop the drying process if said textile clothes load is already dry, or will allow the drying process to continue if said textile clothes load is still wet.

In order to further clarify and better understand the present invention, the dryer machine (100) shown in FIG. 1 is only intended to illustrate rather than to limit the intelligent electronic system for previously sensing the dryness condition of a clothes load as described according to a particularly preferred embodiment of the present invention, since said intelligent electronic system can be applied in any automatic clothes dryer machine. Said dryer machine (100) comprises: a main body (1) or cabinet; a drum (2) rotatory arranged in the center of the dryer machine (100); heating means (3) located preferably on the lower portion of the drum (2); a first motor (4) located on the lower portion of the dryer machine (100) for rotating said drum (2); a propeller fan (5) located on the lower portion of the dryer machine (100); in an alternative embodiment the dryer machine (100) can be provided with a second motor (6) to rotate said fan (5), wherein said second motor (6) can be located in front of the first motor (4), taking into account that only one motor can realize operations of both motors in another embodiment; an outlet conduit (7) arranged in the lower portion of the dryer machine (100); and a control panel (8) located on the outside on the upper section of the front wall of the dryer machine (100).

The main body (1) or cabinet shapes the exterior appearance of the dryer machine (100) and comprises on its front wall an opening through which textile clothes, such as clothes, bed clothing and linen in general, are place inside said dryer machine (100).

The heating means (3) operates to heat the air, which will be injected into the dryer machine (100) to allow total removal of humidity from the textile clothes.

The motor (4) is a power source transmitting motion to the drum (2) for rotation thereof.

The propeller fan (5) operates to create a vacuum pressure and resulting in an airflow that first passes through the heating means (3) and then the hot air passes through the clothes while the clothes rotate inside the drum (2).

The outlet conduit (7) is located preferably on the lower end of the dryer machine (100), and more preferably, it is located in the center of said dryer machine (100) allowing constant extraction of the hot air out of the dryer machine (100). In this regard, said outlet conduit (7) must be totally clear of any foreign object that could impede the exit of hot air and thereby preventing the pressurization of said dryer machine (100).

Control panel (8) includes all the programmed information that allows for the control of the automatic operations of the dryer machine (100).

Nevertheless, referring to the intelligent electronic system of the present invention, it comprises: an electronic integrated circuit (not shown in the figure) preferably of the microcontroller type, preferably located within a control panel (8), wherein said microcontroller receives and processes signals coming from a plurality of temperature sensing means (9) and from humidity sensing means (10) in order to make decisions and to inform the dryer machine (100) what action it must execute.

The plurality of temperature sensing means (9) are located preferably at the air outlet and inlet of the drum (2) and is comprised by at least two sensors that operate to detect or sense the air temperature at the outlet and inlet of the drum (2), of which, the first sensor (9a) being a thermistor located preferably on the cover of the propeller fan (5) which senses the air temperature at the drum's outlet, and the second sensor (9b) being a thermistor located preferably adjacent to the heating means (3) to sense the air temperature at the drum's inlet.

The humidity sensing means (10) are located preferably at the drum's air outlet and comprise a rod sensor for sensing the humidity of said textile clothes load.

The microcontroller integrally comprises a memory for storing the conditions and parameters previously established against which received signals will be compared with, wherein said memory can be a Random Access Memory (RAM) or an Electrically Erasable Programmable Read Only Memory (EEPROM), preferably being a RAM memory. Also, said microcontroller is programmable in a microcontroller assembly language within a programming environment. Additionally, said microcontroller has a specific programming frequency and an instruction cycle time.

Step (a) Collecting information on the air temperature of the drum's outlet and inlet by using temperature sensing means, which send pulses or signals to the microcontroller, similarly pulses or signals of the humidity condition of the textiles clothes load are sent to the microcontroller by using humidity sensing means; with said signals or pulses, the microcontroller then determines the initial conditions of the dryer machine prior to starting-up the motor of said dryer machine; this is realized by: starting a drying cycle by pulsing the start button located on the control panel, which by being interfaced with the microcontroller sends a signal to said microcontroller in order to start collecting information about the air temperature at the outlet ($T_{S1}$) and inlet ($T_{E1}$) of the drum (2) by means of first (9a) and second (9b) sensors, respectively, as well as information about humidity conditions ($H_1$) of the textile clothes load by means of rod sensor (10), said information allowing for setting starting conditions of the dryer machine (100) prior to starting-up the motor (4) of said dryer machine (100), and consequently, based on the preset parameters stored in the RAM memory, being able to make decisions.

Step (b) Determining with the information obtained in the above step a) whether the dryer machine is cold or warm and comparing said information with parameters previously programmed; accordingly, the microcontroller determines whether the dryer machine (100) is cold or hot, in other words, with the information received from the temperature sensing means (9) it determines if a long period of time has elapsed after the last drying cycle and the dryer machine (100) is already cold, or if a drying cycle has just ended and therefore said dryer machine is hot. Said determination is preferably carried out with the first sensor (9a) that sends a signal or pulse to the microcontroller, which compares the information obtained at the drum's outlet ($T_{S1}$) against the preset temperature as a reference in a first parameter ($T_{R1}$), which resulted from experiments based on values depending on the particular construction of the dryer machine (100), wherein said values range from 60° F. to 80° F. (15° C. to 26° C.).

If the sensed condition is "hot" wherein $T_{S1} > T_{R1}$, then the microcontroller sends information to the control panel (8) so that the dryer machine (100) will continue with the drying cycle and end until said textile clothes load is dry. Otherwise, if the sensed condition is "cold" wherein $T_{S1} < T_{R1}$ then the process for previous sensing of dryness of the present invention continues. In a first alternative embodiment of the present invention the parameter $T_{RC}$ is calculated, once the microcontroller has determined that the dryer machine (100)

is hot, said parameter $T_{RC}$ can be calculated using the equation of the straight line, Y=mx+b, wherein $T_{RC}$ is equal to Y; x is obtained from the sensor at the drum's outlet $T_{S1}$; constant b is obtained experimentally and depends on the particular construction as well as on engineering parameters of the dryer; the slope m can be obtained experimentally from collecting air at the outlet ($T_{S1}$) of the drum (2) vs. given periods of time, e.g. periods of time ranging from 3 to 5 minutes.

Nevertheless, in this alternative embodiment, if the sensed condition is "hot" wherein $T_{S1} > T_{R1}$, then $T_{RC}$ is evaluated as a variable that follows the equation of a straight line, whose above described values for x range from (50 to 120), for b range from (0 to 30), and m ranges form (−1 to 0), preferably; and wherein said values are calculated and stored in the RAM of the microcontroller.

Step (c) Letting a first period of time to elapse during which pulses or signals of air temperature conditions of the drum's outlet and inlet continue being received via the temperature sensing means, as well as the humidity conditions of the humidity sensing means of said textile clothes load; this being carried out when: The microcontroller lets a first period of time to elapse ($t_1$) from 45 to 60 seconds, during which pulses or signals of air temperature conditions of the drum's outlet ($T_{S2}$) and inlet ($T_{E2}$) continue being measured via the first (9a) and second (9b) sensors, respectively, as well as the humidity conditions ($H_2$) via the rod sensor (10), said sensors continue sending signals or pulses to the microcontroller, which continues comparing them against the previously programmed values.

Step (d) Verifying whether or not the outlet conduit is obstructed; it is important to verify whether or not said outlet conduit (7) is obstructed, since said conduit may be blocked by any foreign object from the outside of the dryer machine (100), such as small animals or toys, among others. With the information collected by the second air temperature sensor (9b) at the inlet ($T_{E2}$)), which is sent to the microcontroller, which compares said air temperature at the inlet ($T_{E2}$) against the reference temperature of the second parameter ($T_{R2}$) stored in the RAM memory, said parameter was obtained experimentally, the values of which depend on the particular construction of the dryer machine (100) ranging from 200° F. to 240° F. (90° C. to 130° C.), wherewith a first heating slope ($\Delta t_1$) is obtained so as to verify whether or not the outlet conduit (7) of the dryer machine (100) is blocked. If ($\Delta t_1$)>$T_{R2}$ it means that said outlet conduit (7) is obstructed, so the microcontroller stops the previous sensing process of the present invention; while the normal drying cycle continues until said dryer machine (100) senses that the textiles clothes is dry. On the contrary, if said sensed condition indicates there is no overheating, i.e., ($\Delta_1$)<$T_{R1}$ it means that the outlet conduit (7) is unobstructed and then the microcontroller continues with the process of previously sensing the dryness condition of the present invention, thereby determining the initial conditions of the dryer machine (100).

Step (e) Letting a second period of time to elapse during which measuring of air temperature conditions of the drum's outlet and inlet, as well as humidity conditions of said textile clothes load continues; this is carried out as follows: The microcontroller lets a second period of time ($t_2$) of from 20 to 30 seconds to elapse, during which measuring of air temperature conditions of the drum's outlet ($T_{S3}$) and inlet ($T_{E3}$) continues by means of the first (9a) and second (9b) sensors, respectively, as well as humidity conditions ($H_3$) obtained by means of the rod sensor (10), of said textile clothes load continues in order to determine whether the textile clothes load is small or large.

Step (f) Determining whether the textile clothes load is large or small by calculating a second heating slope as well as a third heating slope by using incoming data from the outlet and inlet temperature sensors; wherein the absolute value of the arithmetic difference of both slopes are compared against a preset parameter; if said difference between slopes is lower than the preset value, then the load is considered to be small; otherwise the load is considered to be large; this is done as follows: With the information collected so far (90 seconds maximum) a second heating slope ($\Delta T_2$) is obtained with the outlet air temperature ($T_{S3}$) of the drum (2) and also is obtained a third heating slope ($\Delta T_3$) with the inlet air temperature ($T_{E3}$) of said drum (2), wherein the difference of both heating slopes are compared by the microcontroller against a third preset reference parameter ($T_{R3}$) obtained experimentally, which values depend on the particular construction of the dryer machine (100) ranging from 80 F to 90 F (26° C. to 32° C.). If said difference between temperature slopes ($\Delta T_2$) and ($\Delta T_3$) is lower than ($TR_3$) then the microcontroller determines that the textile clothes load is small, considering a weight approximately lower than ½ Kg of the textile clothes load. Nevertheless, if said difference between temperature slopes ($\Delta T_2$) and ($\Delta T_3$) is greater than the reference value ($T_{R3}$) then the microcontroller determines that the textile clothes load is large, considering a weight greater than ½ Kg of the textile clothes load.

Step (g) Determining humidity conditions of the textile clothes load; if the load is small the load is checked for humidity or dryness, this is done via the humidity sensing means by comparison of the actual value versus a reference preset value; if the load is dry, then the microcontroller instructs to stop the drying cycle, otherwise it instructs to continue with the normal drying cycle. Now then, assuming that the textile clothes load is small, said load must be checked for dryness or wetness by means of the rod sensor (10), which sends a signal or pulse to the microcontroller so as to determine by using previously programmed parameters whether said textile clothes are dry or wet; however, there are wet zones on clothes that cannot be detected by said temperature sensing means (9), so the microcontroller check for said wet zones by comparing the value from the information of the humidity condition ($H_3$) (obtained by the rod sensor (10)) collected so far (within 90 seconds maximum) against a preset humidity parameter for a small load ($H_{RP}$) stored in the RAM memory, wherein said preset parameter ($H_{RP}$) corresponds to about 8% humidity minimum. Within this context, if the obtained humidity value ($H_3$) is lower than the preset parameter ($H_{RP}$), this means that the small textile clothes load is still wet and therefore the microprocessor sends said information to the control panel (8) thereby the dryer machine (100) continues with the normal drying cycle until said load is completely dry. But is if said obtained humidity value ($H_3$) is greater than the preset parameter ($H_{RP}$), it means the textile clothes load is dry, then the microcontroller instructs stopping the dryer machine (100) thus ending the previous sensing method. In a second alternative embodiment, if the obtained humidity value ($H_3$) is lower than the preset parameter ($H_{RP}$), it means that the small textile clothes load is still wet and therefore the microcontroller starts a counter, which must count the cycles of this second alternative embodiment; hence when a small wet load (($H_3$) is lower than the preset parameter ($H_{RP}$)) is sensed, the dryer machine continues drying for a period of time of about 1 to 5 minutes, since it will take some time for the small clothes inside the relatively large drum to contact the rod sensor (10) because, due to design reasons, said sensor has a predetermined contact area as well as a predetermined location inside the dryer machine; this allows us to realize or perceive that the small clothes inside the drum are not making continue contact with the rod sensor (10), said contact being rather highly random; thereby, in this case a delay time as well as a series of checks are required; then, once said period of time has elapsed, the electronic control calculates again if $(H_3)<(H_{RP})$; another cycle is counted again, by adding a unit to the counter, allowing for the dryer to operate for another given period of time, until $(H_3)>(H_{RP})$ or said counter is greater than or equal to a given number (preferably the maximum number of times the preferred second embodiment's cycle repeats itself should be between 10 to 15 times); once one of these conditions are met the electronic control instructs stopping the dryer machine.

Turning our attention again to the preferred embodiment; for the case where the textile clothes load is large, the information collected so far by the microcontroller is not enough to determine whether said load is wet or dry, so said microcontroller must wait an additional time with said normal drying cycle running until getting the appropriate data to make the appropriate decision.

Step (h) Letting a third period of time to elapse during which the microcontroller continues to read and store data from both the outlet and inlet temperature sensors of the drum, as well as to get readings from the humidity sensing means, which is carried out as follows: The microcontroller lets a third period of time ($t_3$) from 75 to 90 seconds to elapse, with a maximum time so far of 180 seconds, during which the microcontroller continues receiving signals of the air temperature conditions at the outlet ($T_{S4}$) and inlet ($T_{E4}$) by means of the first (9a) and second (9b) sensors, respectively, as well as the humidity conditions ($H_4$) obtained thanks to the rod sensors (10) of said large textile clothes load.

(i) Determining humidity conditions of the textile clothes load; if said load is large, it is done by means of the drum's outlet temperature sensors, which values are compared against a reference preset value; if the load is dry, then the microcontroller instructs to stop the drying cycle, otherwise it instructs to continue with the normal drying cycle; this is carried out as follows: The microcontroller determines if the large textile clothes load is dry. With the information collected so far (a maximum of 180 seconds) a fourth heating slope ($\Delta T_4$) is obtained, wherein the microcontroller compares said fourth heating slope ($\Delta T_4$) of said drum against a fourth preset temperature parameter ($T_{R4}$) stored in the RAM memory, as obtained experimentally, the values of which depend on the particular construction of the dryer machine (100), said values ranging from 6 to 9, with a first alert emitted indicating whether said load is wet or dry, such that if said fourth heating slope ($\Delta T_4$) is lower than the temperature of said fourth temperature parameter ($T_{R4}$) then said load is still wet and the microcontroller sends information to the control panel for the dryer machine (100) to continue with the normal drying cycle. On the contrary, if the fourth heating slope ($\Delta T_4$) is greater than the temperature of said fourth temperature parameter ($T_{R4}$) then it means that said load is dry. Despite the latter, there are wet zones on the clothes that cannot be sensed by the temperature sensing means (9), so the microcontroller additionally double checks for said wet zones by comparing the information value on the humidity condition ($H_4$) (collected by the rod sensor (10)) so far obtained (in 180 seconds maximum) against the preset humidity parameter of said large load ($H_{RG}$) stored in the RAM memory, said preset humidity parameter of said large load ($H_{RG}$) corresponds to about 8% humidity minimum. Within this context, if the obtained humidity value ($H_4$) is lower than the preset humidity parameter ($H_{RG}$), it means that the large textile clothes load is still wet and therefore the microprocessor sends information to the control panel for the dryer machine (100) to continue with the normal drying cycle until said load is completely dry. But instead, if said obtained humidity value ($H_4$) is greater than the preset humidity parameter of said large load ($H_{RG}$), it means that the large textile clothes load is already dry, so the microcontroller sends information to the control panel to automatically stop the dryer machine (100), thus ending in that very moment the previous sensing process of the present invention.

In the case of the first alternative embodiment a prerequisite is that the dryer machine (100) must be hot, thereby the method portion being an object of the present invention just described above is replaced by this alternative section of the method regarding to the first alternative embodiment of the present invention, thus $T_{R4}$ is substituted by $T_{RC}$ as is described as follows: The microcontroller retrieves the previously calculated value $T_{RC}$ (which follows the equation of a straight line); so the microcontroller now compares the $T_{RC}$ value against $\Delta T_4$ calculated with the information so far collected (in 180 seconds maximum); if $T_{RC}>\Delta T_4$ is true the microprocessor assumes that the textile clothes are wet the microcontroller continues with the drying cycle normally; otherwise, the microcontroller determines that the textile clothes are completely dry.

Step (j) Checking for humidity by zones, this is performed by means of the humidity sensing means, in order to calculate a humidity condition, once the microcontroller has calculated said data, it compares it with a humidity preset parameter for a large load; if the microcontroller determines the absence of humidity zones, then it instructs to stop the drying cycle, otherwise instructs to continue with the normal drying cycle, this is carried out as follows: Now, the microcontroller checks that the clothes are free of stains or water zones, whereby the microcontroller calculates again the humidity parameter ($H_4$) by means of the rod sensor (10); if said obtained humidity value ($H_4$) is greater than the preset humidity parameter of said large load ($H_{RG}$), it means that the large textile clothes load is already dry, so the microcontroller sends information to the control panel to automatically stop the dryer machine (100), thus ending in that very moment the previous sensing process of the present invention; otherwise, if the microcontroller assesses that the obtained humidity value ($H_4$) acquired thanks to the rod sensors (10) is lower than the preset humidity value for a large load ($H_{RG}$), then, it means that the large textile clothes load is still wet; thus the microcontroller continues with its normal drying cycle.

As can be seen from the above, the intelligent electronic system by means of the microcontroller allows for an efficient sensing of the dryness condition of a textile clothes load before starting a normal drying cycle, thus preventing unnecessary consumption of power, as well as an early deterioration of said textile clothes by not subjecting them to said hot cycles.

Another peculiar aspect of the present invention is to provide a method for previously sensing the dryness condition of the textile clothes load, so now, a more specific reference will be made to FIG. 2 of the accompanying drawings, there is shown several steps of said method for previously sensing the dryness condition of a textile clothes load applicable to a dryer machine (100), comprising the steps of:

(a) Starting a drying cycle in the dryer machine (100) by pulsing the start button located on the control panel (10), which sends a signal to the microcontroller that in turn starts the method for previous sensing the dryness condition, collecting information about the air temperature at the outlet ($T_{S1}$) and inlet ($E_1$) of the drum (2) by means of first (8a) and second (8b) sensors, respectively, as well as information about humidity conditions ($H_1$) of the textile clothes load by means of rod sensor (9), said information allowing for setting starting conditions of the dryer machine (100) prior to starting up the motor (4) of said dryer machine (100), and thus, based on the preset parameters, being able to make decisions.

(b) Determining (D10), with the information obtained in step a) above, by means of the microcontroller whether the dryer machine (100) is cold or hot, in other words, determining whether a long period of time has elapsed after the last drying cycle and the dryer machine (100) is already cold, or a drying cycle has just ended and therefore said dryer machine is hot. Said determining step is preferably carried out using the first sensor (9a), which sends a signal or pulse to the microcontroller that compares the information collected at the drum's outlet ($T_{S1}$) against the temperature information preset as a reference in a first parameter ($T_{R1}$).

If the sensed condition is "hot" where $T_{S1}>T_{R1}$, then the drying cycle continues until the textile clothes load is dry. Otherwise, if the sensed condition is "cold" wherein $T_{S1}<T_{R1}$, then the method for previously sensing of dryness of the present invention continues.

(c) Letting a first period of time ($t_1$) from 45 to 60 seconds, preferably 60 seconds, to elapse, during which air temperature conditions of the drum's outlet ($T_{S2}$) and inlet ($T_{E2}$) continue being measured via the first (9a) and second (9b) sensors, respectively, as well as the humidity conditions ($H_2$) via the rod sensor (10), wherein said sensors continue sending signals or pulses to the microcontroller, which continues comparing them against the previously programmed values stored in the RAM memory.

(d) Verifying (D20) by means of the microcontroller whether or not the outlet conduit (7) is obstructed, since said conduit may be blocked by any foreign object from the outside of the dryer machine (100), such as small animals or toys, among others. With the information collected by the second air temperature sensor (9b) at the inlet ($T_{E2}$) a first heating slope ($\Delta t_1$) is obtained by comparing said air temperature at the inlet ($T_{E2}$) against the reference temperature of the second parameter ($T_{R2}$), so as to check whether or not the outlet conduit (7) of the dryer machine (100) is blocked. Then, the microcontroller, with the information thus collected, performs a comparison of parameters, in such a manner that if $\Delta T_1>T_{R1}$ it means that said outlet conduit (7) obstructed, and therefore the previous sensing process of the present invention is stopped; while the normal drying cycle continues until said dryer machine (100) senses that the textiles clothes is dry. On the contrary, if said sensed condition indicates there is no overheating, i.e., $\Delta T_1<T_{R1}$ it means that the outlet conduit (7) is unobstructed and then the microcontroller continues with the process of sensing the previous dryness condition of the present invention, thereby determining the initial conditions of the dryer machine (100).

(e) Letting a second period of time ($t_2$) of from 20 to 30 seconds, preferably 30 seconds, to elapse, during which measuring of the air temperature conditions of the drum's outlet ($T_{S3}$) and inlet ($T_{E3}$) continues by means of the first (9a) and second (9b) sensors, respectively, as well as humidity conditions ($H_3$) of said textile clothes load continues, wherein said information is sent to the microcontroller for it to make the appropriate decisions.

(f) Determining (D30) whether the textile clothes load is small or large. With the information collected so far (90 seconds maximum) a second heating slope ($\Delta T_2$) is obtained with the outlet air temperature ($T_{S3}$) of the drum (2) and also a third heating slope ($\Delta_{T3}$) is obtained with the inlet air temperature ($T_{E3}$) of said drum (2), wherein the difference between both heating slopes are compared against a third preset parameter of a reference temperature ($T_{R3}$). If the difference between said second ($\Delta T_2$) and third ($\Delta_{T3}$) heating slopes is lower than the preset reference temperature ($T_{R3}$) then the textile clothes load is small, considering a weight approximately lower than ½ Kg of the textile clothes load. On the contrary, if the difference between said second ($\Delta T_2$) and third ($\Delta T_3$) heating slopes is greater than the preset reference temperature ($T_{R3}$) then the textile clothes load is large, considering a weight approximately greater than ½ Kg of the textile clothes load. For the case where the textile clothes load is large, the information collected so far is not enough so as to determine whether said load is wet or dry, so said microcontroller must wait an additional time with said normal drying cycle running until the appropriate data are obtained.

(g) Checking (D40) of humidity conditions of the textile clothes load; assuming the textile clothes load is small, it is checked whether said load is dry or still wet by means of the rod sensor (10), which sends a signal or pulse to the microcontroller to determine by using previously programmed parameters whether the textile clothes are dry or wet; the microcontroller compares the information value about the humidity condition ($H_3$) collected so far thanks to the rod sensor (10) (in 90 seconds maximum) against a preset humidity parameter for a small load ($H_{RP}$) stored in the memory, wherein said preset humidity parameter ($H_{RP}$) corresponds to about 8% humidity minimum.

Within this context, if the humidity value obtained ($H_3$) is lower than the preset humidity value ($H_{RP}$), then the small textile clothes is still wet and therefore the normal drying cycle continues until said load is completely dry. But if said obtained humidity value ($H_3$) is greater than the preset humidity parameter ($H_{RP}$), it means that the small textile clothes load is already dry, then the dryer machine automatically stops thus ending the previous sensing method.

(h) Letting a third period of time ($t_3$) of from 75 to 90 seconds, more preferably 90 seconds, to elapse, with a maximum time so far of 180 seconds, during which the microcontroller continues receiving signals of air temperature conditions at the outlet ($T_{S4}$) and inlet ($T_{E4}$) by means of the first (9a) and second (9b) sensors, respectively, as well as the humidity conditions ($H_4$) of the large textile clothes load.

(i) Determining (D50) by means of the microcontroller if the large textile clothes load is dry. With the information collected so far (a maximum of 180 seconds) a fourth heating slope ($\Delta T_4$) is obtained, by comparing the outlet air temperature ($T_{S4}$) of said drum against a fourth preset temperature parameter ($T_{R4}$) stored in the RAM memory, with a first alert emitted indicating whether said load is wet or dry, such that if said outlet temperature ($T_{S4}$) is lower than the temperature of said fourth temperature parameter ($T_{R4}$) then said load is still wet and the normal drying cycle continues. But, if said outlet temperature ($T_{S4}$) is greater than the temperature of said fourth temperature parameter ($T_{R4}$) then said load is dry.

(j) Despite the above, there are wet zones on the clothes that cannot be sensed by the temperature sensing means (9), so the microcontroller additionally double checks for said wet zones by comparing the information value on the humidity condition ($H_4$) so far obtained (in 180 seconds maximum) against the preset humidity parameter of said large load ($H_{RG}$), wherein said preset humidity parameter of said large load corresponds to 8% humidity minimum. Within this context, if the humidity value obtained ($H_4$) is lower than the preset humidity value of said large load ($H_{RG}$), then the large textile clothes is still wet and therefore the dryer machine (100) continues the normal drying cycle until said load is completely dry. But instead, if said obtained humidity value ($H_4$) is greater than the preset humidity parameter of said large load ($H_{RG}$), it means that the large textile clothes load is already dry, so the dryer machine (100) automatically stops, thus ending in that very moment the previous sensing process of the present invention.

As can be seen from the foregoing description of some embodiments of the method for previously sensing the dryness condition of the present invention, it is possible to detect in the shortest time as possible (within a time from 90 to 180 seconds, depending on whether the textile clothes load is small or large) whether the textile clothes load is dry or still wet, said sensing method prevents overheating of clothes and unnecessary power consumption, and saves time.

It is clear that the previous sensing method cannot be carried out alone, because the intelligent electronic system is required to carry out the same by means of the microcontroller as describe and claimed in the present invention.

While the foregoing description has made reference to some embodiments of the method for previously sensing the dryness condition of a textile clothes load, applicable to an automatic dryer of the present invention, emphasis should be made to a number of possible modifications to said embodiments, without departing from the true scope of the invention, such as modifying the steps of the method, modifying reference parameters, among many other modifications, therefore, the present invention should not be limited except by what is established in the state of the art as well as by the appended claims.

The invention claimed is:

1. An automatic electronic clothes dryer machine, comprising a main body or cabinet; a rotatory drum arranged in the center of the dryer machine; a heating device located on the lower portion of the drum; a first motor located on the lower portion of the dryer machine for rotating said drum; a propeller fan located on the lower portion of the dryer machine; an outlet conduit arranged on the lower portion of the dryer machine; a control panel located on the external upper section of the front wall of the dryer machine; said main body or cabinet shape includes on its front wall an opening with a hinged door arranged thereon, which allows or prevents access to the inside of the drum of said dryer machine, allowing to place objects or textiles inside said drum; wherein the dryer machine further comprises:
   i. an electronic integrated circuit of the microcontroller type, located within the control panel, said microcontroller further comprises a memory to store preloaded conditions and parameters, in order to make decisions based on a verification;
   ii. at least two temperature sensors for sensing temperature and sending signals of said sensed temperature to the microcontroller, located at the drum's air outlet and inlet, wherein, the first sensor is a thermistor located on the propeller fan cover for sensing the air temperature at the drum's outlet and the second sensor is a thermistor located adjacent to the heating device for sensing the air temperature at the drum's inlet;
   iii. a humidity sensor for sensing humidity and sending signals of said sensed humidity to the microcontroller, located at the drum's air outlet and comprises rod sensor;

wherein the dryer machine;
   (a) collects information on the air temperature of the drum's outlet and inlet by using at least one of the at least two temperature sensors, which send pulses or signals to the microcontroller, similarly pulses or signals of the humidity condition of the textiles clothes load are sent to the microcontroller by using the humidity sensor; the microcontroller having said signals or pulses received, then determines the initial conditions of the dryer machine prior to starting up the motor of said dryer machine;
   (b) determines, with the information obtained in the step a) above, whether the dryer machine is cold or warm and comparing said information with parameters previously programmed;
   (c) provides for a first period of time to elapse during which pulses or signals of air temperature conditions of the drum's outlet and inlet will continue being received via at least one of the at least two temperature sensors, as well as the humidity conditions via the humidity sensor of said textile clothes load;
   (d) determines whether or not said conduit is obstructed with the collected information by the temperature sensor located in the air inlet the microcontroller, compares said temperature at the air inlet with a reference temperature stored in the RAM memory, wherein a first heating slope is obtained so as to verify if the outlet conduit of the dryer machine is blocked, if the outlet conduit is obstructed then the microcontroller stops the method for previously sensing the dryness condition of a textile clothes load and continues with the normal drying cycle; if the outlet conduit is not obstructed then the microcontroller continues with method for previously sensing the dryness condition of a textile clothes load;
   (e) provides for a second period of time to elapse during which measuring of air temperature conditions of the drum's outlet and inlet, as well as humidity conditions of said textile clothes load continues;
   (f) determines whether the textile clothes load is large or small by calculating a second heating slope as well as a third heating slope by using incoming data from the outlet and inlet temperature sensors, respectively; the second heating slope is obtained with the outer air temperature of the drum and the third heating slope is obtained with the air inlet temperature of the drum; wherein the absolute value of the arithmetic difference of both slopes are compared with a preset parameter; if said difference between slopes is lower than the preset value, then the load is considered to be small; otherwise the load is considered to be large;
   (g) determines humidity conditions of the textile clothes load; if the load is small the load checked for humidity or dryness, this is done via the humidity sensor by comparison of the actual value against a reference preset value; if the load is dry, then the microcontroller instructs to stop the drying cycle, otherwise it instructs to continue with the normal drying cycle;

(h) provides for a third period of time to elapse during which the microcontroller continues to read and store data from both the drum's outlet and inlet temperature sensors, as well as to get readings from the humidity sensor;

(i) determines humidity conditions of the textile clothes load; if said load is large, this is realized by the drum's outlet temperature sensors, which values are compared with a reference preset value; if the load is dry, then the microcontroller instructs to stop the drying cycle, otherwise it instructs to continue with the normal drying cycle; and (j) reviews humidity by zones, this is performed by the humidity sensor, in order to calculate a humidity condition, once the microcontroller has calculated said data, it compares it with a humidity preset parameter for large loads; if the microcontroller determines the absence of humidity zones, then it instructs to stop the drying cycle, otherwise it instructs to continue with the normal drying cycle.

2. The method for previously sensing the dryness condition of a textile clothes load, applicable to an automatic electronic clothes dryer machine, according to claim 1, wherein element (b), further determines whether the dryer machine is cold or hot using information collected and compares it against previously programmed parameters, if the microcontroller determines the machine is hot then said microcontroller calculates the parameter TRC being a variable that follows the equation of a straight line, and then stores it in its RAM memory; then the microcontroller continues with elements (c), (d), (e), (f), (g), (h), in a normal way; if in element (f) the microcontroller determines that said load is large; on reaching element (i) the microcontroller retrieves the value of the parameter TRC as a variable which follows the equation of a straight line so as to compare it against the humidity conditions ΔT4 of the textile clothes load; if the microcontroller determines that the load is wet, the microcontroller instructs to continue with the drying cycle; otherwise, if the microcontroller determines that the textile clothes are completely dry, then it goes to step (j).

3. The method for previously sensing the dryness condition of a textile clothes load, applicable to an automatic electronic clothes dryer machine, according to claim 1, further characterized in that in step (f) if the microcontroller determines that the load is small and that said load is wet, the microcontroller starts a counter, subsequently the dryer machine continues drying for a given period of time, once said time has elapsed the microcontroller calculates again the humidity parameter (H3), and again it compares it with the parameter ($H_{RP}$) stored in the microcontroller memory, if after said comparison the microcontroller determines that the small load is still wet, then it increments the counter by one unit, allowing for the dryer machine to operate for another given period of time; these steps are repeated until said counter is equal to or greater than a predetermined number or until the microcontroller determines from said comparison that the load is dry; when any of these two conditions is met then the microcontroller instructs to stop the dryer machine.

4. The method for previously sensing the dryness condition of a textile clothes load, applicable to an automatic electronic clothes dryer machine, according to claim 3, further characterized in that said given period of time the microcontroller lets the dryer machine to operate ranges from 1 minute to 5 minutes.

5. The method for previously sensing the dryness condition of a textile clothes load, applicable to an automatic electronic clothes dryer machine, according to claim 3, further characterized in that the maximum number of times the cycle repeats itself is of from 10 to 15 times; therefore, the counter must be equal to or greater than a number ranging from 10 to 15.

6. The method for previously sensing the dryness condition of a textile clothes load, applicable to an automatic electronic clothes dryer machine, according to claim 1, further characterized in that the first period of time of step c) is from 45 to 60 seconds, the period of time of step c) is about 60 seconds.

7. The method for previously sensing the dryness condition of a textile clothes load, applicable to an automatic electronic clothes dryer machine, according to claim 1, further characterized in that the second period of time of step e) is from 20 to 30 seconds.

8. The method for previously sensing the dryness condition of a textile clothes load, applicable to an automatic electronic clothes dryer machine, according to claim 1, further characterized in that in step (h) the third period of time (t3) is 75 to 90 seconds.

* * * * *